Jan. 13, 1942. O. F. GOTTLIEB ET AL Re. 22,005

ENGINE STARTER

Original Filed March 31, 1939 2 Sheets-Sheet 1

Inventors
Oscar F. Gottlieb
Ira Milton Jones
Erich Eugene Kohls
By Ira Milton Jones
Attorney Jan. 13, 1942. O. F. GOTTLIEB ET AL Re. 22,005

ENGINE STARTER

Original Filed March 31, 1939 2 Sheets-Sheet 2

Inventors
Oscar F. Gottlieb
Ira Milton Jones
Erich Eugene Kohls
By Ira Milton Jones
Attorney Reissued Jan. 13, 1942

Re. 22,005

UNITED STATES PATENT OFFICE 22,005

ENGINE STARTER

Oscar F. Gottlieb, Milwaukee, and Ira Milton Jones and Erich Eugene Kohls, Mequon, Wis., assignors to Briggs & Stratton Corporation, Milwaukee, Wis., a corporation of Delaware Original No. 2,201,310, dated May 21, 1940, Serial No. 265,252, March 31, 1939. Application for reissue August 12, 1941, Serial No. 406,540

18 Claims. (Cl. 74—7)

This invention relates to engine starters, and has as one of its objects to provide a more compact and efficient starter mechanism for use in automobiles.

Another object of this invention is to provide an engine starter in which the pinion stop which limits motion of the pinion toward its operative position is entirely independent of the drive shaft so as to obviate the necessity for mounting a separate stop collar on the shaft.

Another object of this invention is to provide a structure in which the pinion stop engages an external portion of the pinion or a part carried thereby so as to permit the smallest possible overall diameter for the pinion and its directly associated parts, to thereby adapt the starter for use with small engines where space is limited.

Another object of this invention is to provide an engine starter of the type in which resiliency in the drive from the shaft to the pinion is obtained through the use of a rubber driving element held in compression and effecting its driving function through frictional contact with adpacent surfaces, wherein adequate means are provided for precluding the passage of oil and dirt to the rubber element, and wherein this same means is utilized to limit the motion of the pinion to operative position.

Another object of this invention is to provide an engine starter of the type described wherein all of the operating mechanism is housed within an outer barrel-like shell which guards the threaded portions against coming in contact with dirt and foreign matter, and generally improves the operation of the starter and enhances its appearance.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claims.

The accompanying drawings illustrate one complete example of the physical embodiment of the invention constructed in accordance with the best mode so far devised for the practical application of the principles thereof, and in which.

Referring now particularly to the accompanying drawings in which like numerals indicate like parts, the numeral 5 designates an engine ring gear with which a pinion 6 is adapted to be meshed. The pinion 6 is mounted to move longitudinally along the drive shaft 7 of a starting motor 8 and to turn therewith, as is customary.

Figure 1:
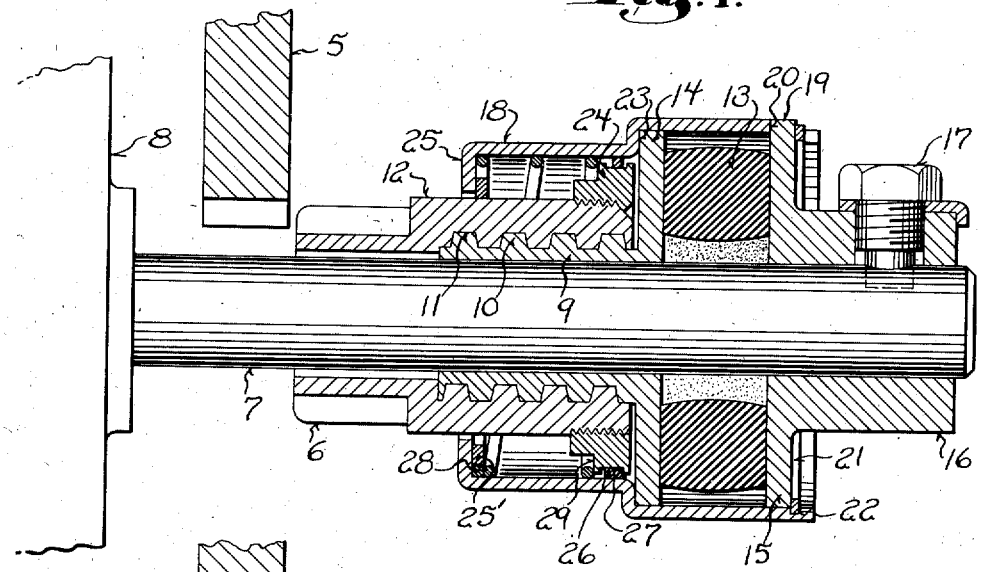
Figure 1 is a longitudinal section view through an engine starter constructed in accordance with this invention, with the parts shown in the positions they occupy when the pinion is retracted.
Figure 2:
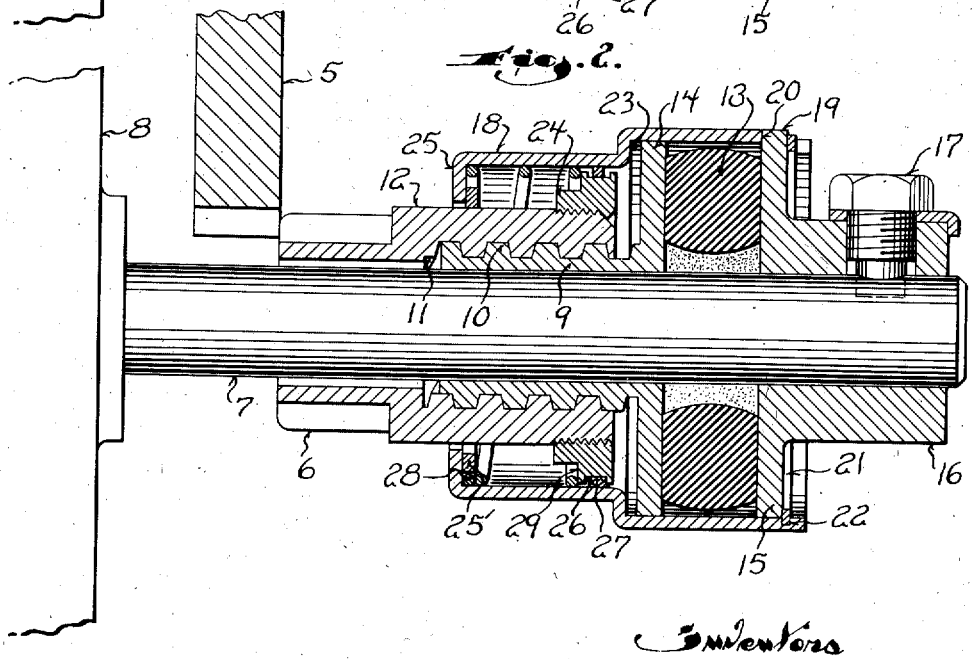
Figure 2 is a view similar to Figure 1, showing the parts in the positions they assume when the pinion teeth abut those of the ring gear.
Figure 3:
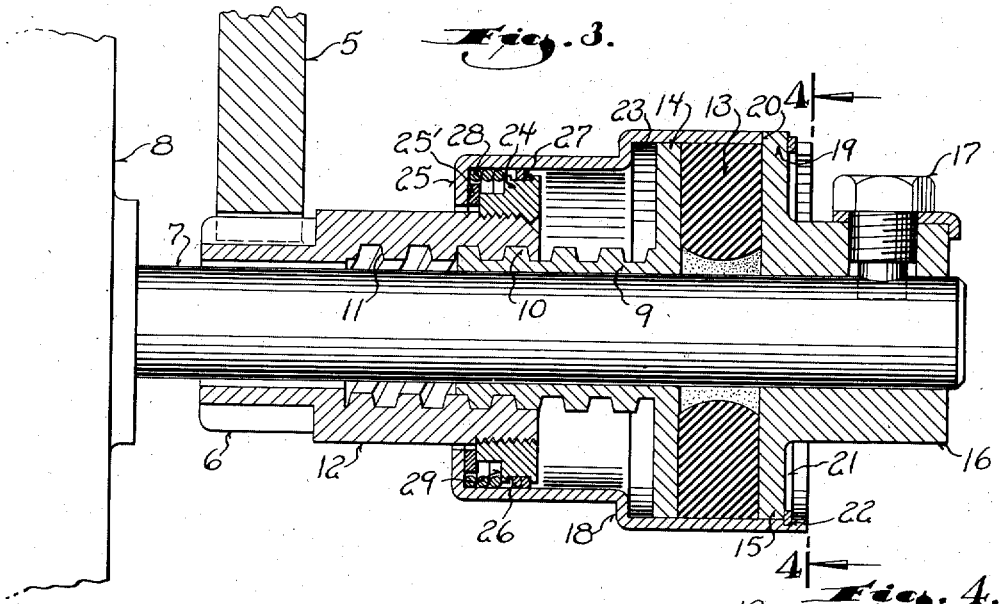
Figure 3 is a view similar to Figure 1, showing the pinion fully meshed with the ring gear and about to transmit rotation thereto.
Figure 4:
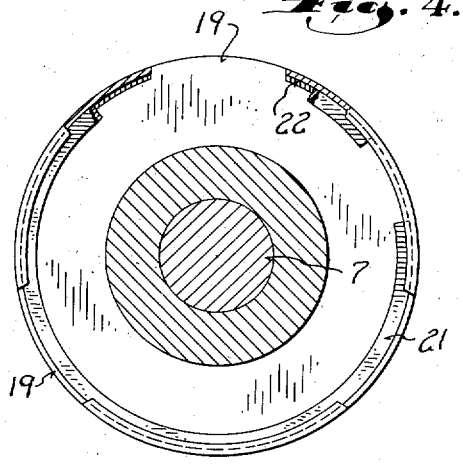
Figure 4 is a cross sectional view through Figure 3 on the plane of the line 4—4.
Figure 5:
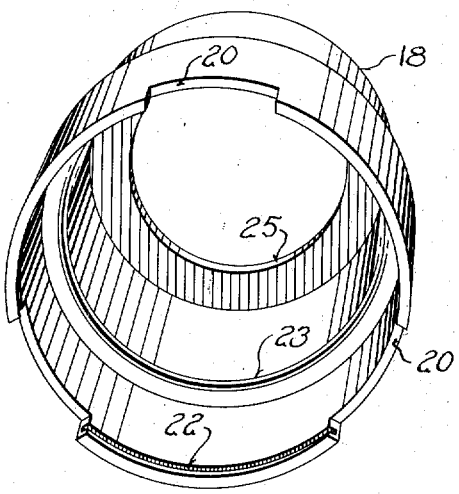
Figure 5 is a perspective view of the outer shell per se.

The pinion is propelled to and from its operative position meshing with the ring gear, as shown in Figure 3, by means of a driving member 9 loosely slidable on the shaft and having a threaded connection with the pinion. This threaded connection is formed by external threads 10 on the driving member engaging internal threads 11 in the bore of a hub 12 extending rearwardly from the pinion proper. The hub may be an integral part of the pinion or it may be formed separately and brazed or otherwise secured thereto.

Rotation is imparted to the driving member from the shaft through a resilient driving connection comprising a collar 13 of rubber or other suitable material having cubical elasticity and having a high coefficient of friction, confined between one face of a flange 14 on the driving member and one face of a flange 15 which forms part of a collar 16. The collar 16 is mounted on the shaft and secured thereto by a set screw 17.

The flanges 14 and 15 are held against separation beyond a predetermined distance at which the rubber collar is maintained under an initial degree of compression, by means of an outer barrel-like shell or housing member 18. This barrel-like shell is preferably formed from a metal tube and has one end secured to the flange 15 by means of radial outwardly projecting lugs 19 on the periphery of the flange engaging in correspondingly positioned slots 20 in the edge of the shell where they are held by a spring snap ring 21 engaging in a groove 22 in the inner wall of the shell. Any other suitable manner of securing the adjacent end of the shell to the flange 15 may be employed, as will be readily apparent.

Medially of its ends, the shell is abruptly reduced in diameter to provide a shoulder 23 with which the flange 14 is engageable to limit movement thereof away from the flange 15. In this manner, the flanges 14 and 15 are held against separation beyond a predetermined distance to at all times maintain the rubber collar 13 under an initial degree of compression to insure the transmission of rotation from the drive shaft to the driving member.

As is well known, upon initial rotation being imparted to the driving member, the pinion, because of its inertia, does not turn, but is propelled longitudinally toward the ring gear 5. If during its forward propulsion, it strikes the teeth of the ring gear, the endwise resiliency of the rubber collar cushions the impact and builds up sufficient torque to turn the pinion and effect proper meshing.

When the pinion reaches its fully meshed position, its forward propulsion should cease so that the load of the engine can be picked up. Heretofore, the stop to limit forward motion of the pinion was generally a separate collar secured to the shaft inwardly of the ring gear to be engaged by the end of the pinion as it moved to its fully meshed position. This construction has obvious objections, which are entirely overcome with the present invention.

In this instance, the forward propulsion of the pinion is limited by the engagement of a collar 24 threaded, welded or otherwise secured to the end of the pinion hub 12 in position to engage an inturned flange 25 on the adjacent end of the outer shell. The outer barrel-like shell thus not only holds the flanges 14 and 15 against separation to maintain the rubber ring in compression, but also provides the pinion stop, and because it engages the pinion externally, it follows that the diameter of the pinion may be held to a minimum compatible with good design.

Inasmuch as the collar 24 and the flange 25 move relative to each other as the load of the engine is picked up and the rubber ring twists, a hardened washer 25' is provided therebetween.

The outer shell-like housing has the additional function of excluding oil and extraneous matter from the rubber ring and the screw threads, even when the pinion is projected to its operative position shown in Figure 3. In other words, the entire driving mechanism for propelling and driving the pinion is housed within the outer shell.

An additional safeguard against ingress of oil and foreign matter into the interior of the shell is provided by a sealing ring 26 retained in a groove 27 formed in the outer surface of the collar 24 and slidably engaging the adjacent inner cylindrical surface of the shell.

Accidental or unintentional meshing of the pinion with the ring gear is prevented by a light "anti-creep" or rebound spring 28 confined between the flange 25 on the shell and a shoulder 29 on the collar 24 formed by having its outer surface stepped.

From the foregoing description taken in connection with the accompanying drawings, it will be readily apparent that this invention provides an engine starter which is exceptionally compact and which, because its outer protecting housing completely conceals all of the driving mechanism, not only guards against ingress of dirt, oil and grease and other extraneous matter into the interior of the unit, but also has improved appearance.

What we claim as our invention is:

1. In an engine starter, the combination of: a drive shaft; an externally threaded member freely slidably rotatably mounted on the shaft; a pinion movable endwise along the shaft and rotatable therewith; a sleeve on the pinion internally threaded and engaging the external thread on said member so that the sleeve and pinion are supported on said member; opposed abutments on said externally threaded member and the shaft; a resilient driving connection from the shaft to said member comprising an elastically deformable connector confined between said abutments; and means for limiting endwise forward movement of the pinion toward one end of the shaft, said means comprising a shoulder on the exterior of the sleeve at a point remote from the pinion, a part supported from the opposite end portion of the shaft and directed forwardly toward the pinion, and an abutment on said part at all times in juxtaposition to the sleeve to be engageable with the shoulder thereon.

2. In an engine starter, the combination of: a drive shaft; a pinion movable endwise along the shaft and rotatable therewith; a sleeve on the pinion provided with an internal screw thread; a member loose on the shaft and externally threaded to fit the threads of the pinion sleeve; a resilient driving connection from the shaft to said member whereby rotation is imparted from the shaft to the member to automatically propel the pinion toward its operative position and thereafter resiliently transmit torque thereto, said driving connection including a member of elastically deformable material under compression between abutments on said member and the shaft and at all times lying between the pinion and one end of the shaft; and means for limiting endwise movement of the pinion toward its operative position comprising, a member anchored to said end of the shaft and reaching around the driving connection to have a part thereof adjacent to said sleeve, an abutment on said part, and a shoulder on the exterior of the pinion sleeve engageable with said abutment.

3. In an engine starter including: a pinion; an internally threaded sleeve on the pinion; a member having an externally threaded portion threaded in said pinion sleeve; a member adapted to be secured to a drive shaft; a resilient driving connection between said members including, a rubber element drivingly connected with said members solely through frictional engagement; means enclosing said connection to exclude grease and dirt therefrom; and cooperating means on said last named means and the pinion sleeve for limiting endwise movement of the pinion in one direction.

4. An engine starter of the character described comprising: a pinion; a threaded sleeve on the pinion; a driving member having a threaded portion threaded to the pinion sleeve whereby relative rotation between the pinion and said driving member effects relative endwise motion between said parts; a member adapted to be fixed to a drive shaft; a rubber element confined between said driving member and said last named member to provide a resilient driving connection therebetween; an outer housing receiving support from the member which is attachable to the drive shaft; means on the outer housing engageable with the driving member to limit movement apart between said members and maintain the rubber element in compression; and means carried by said housing member and engageable with a part on the pinion sleeve to limit endwise movement of the pinion in one direction.

5. An engine starter of the character described comprising: a pinion; a threaded sleeve on the pinion connected thereto; a driving member having a threaded portion threaded to the pinion sleeve whereby relative rotation between the pinion and said driving member effects relative endwise motion between said parts; a member adapted to be fixed to a drive shaft; a rubber element confined between said driving member and said last named member to provide a resilient driving connection therebetween; an outer housing receiving support from the member which is attachable to the drive shaft; means on the outer housing engageable with the driving member to limit movement apart between said members and maintain the rubber element in compression; an extension on said housing member projecting toward the pinion; and cooperating means on said extension and the connected pinion and sleeve engageable to limit endwise movement of the pinion in one direction.

6. An engine starter of the character described comprising: a pinion; a threaded sleeve on the pinion; a driving member having a threaded portion threaded to the pinion sleeve whereby relative rotation between the pinion and said driving member effects relative endwise motion between said parts; a member adapted to be fixed to a drive shaft; a rubber element confined between said driving member and said last named member to provide a resilient driving connection therebetween; an outer housing receiving support from the member which is attachable to the drive shaft; means on the outer housing engageable with the driving member to limit movement apart between said members and maintain the rubber element in compression; and a pinion stop carried by said housing member.

7. An engine starter of the character described comprising: a barrel-like outer shell; a pinion; a part extended from the pinion into the shell; co-operating means on said part and the end of the shell nearest the pinion for limiting relative endwise motion thereof apart; a member securable to a drive shaft and connected with the shell; and a torsionally resilient driving connection from said member to the pinion, said driving connection including internal threads on said part extended from the pinion and an externally threaded actuator inside the shell and engaging the internal threads of said pinion part so that the threaded connection is at all times covered.

8. An engine starter of the character described comprising: a barrel-like outer shell; means at one end of the shell providing an abutment inside the shell; a pinion; an internally threaded part extended from the pinion into the shell; means on said part engageable with the abutment to limit outward movement of the pinion with respect to the shell; a member fixed to the shell and bored for reception of a drive shaft to which said member is securable, whereby the shell becomes fixed with respect to the drive shaft and engagement of the means on the pinion part with the shell abutment constitutes a pinion stop; a driving connection from said member to the pinion, said driving connection comprising, a driving member inside the shell and having an external thread engaging the threads of the pinion part; cooperating means on the driving member and the shell for limiting movement of the driving member away from the first named member while permitting movement thereof toward said first named member; and a rubber element confined between said two members and capable of transmitting rotation from one to the other.

9. An engine starter of the character described comprising: an outer barrel-like shell having an instruck flange at one end; a pinion; a sleeve extended from the pinion into said end of the shell; a stop collar secured on the inner end of the sleeve and engageable with the instruck flange to limit outward movement of the pinion with respect to the shell; a member fixed to the opposite end of the shell, said member being bored for reception of a drive shaft to which said member is securable; a driving member inside the shell and having a threaded connection with the pinion sleeve; and a resilient driving connection from said bored member to the driving member.

10. An engine starter of the character described comprising: an outer barrel-like shell having an instruck flange at one end; a pinion; a sleeve extended from the pinion into said end of the shell; a stop collar secured on the inner end of the sleeve and engageable with the instruck flange to limit outward movement of the pinion with respect to the shell; a member fixed to the opposite end of the shell, said member being bored for reception of a drive shaft to which said member is securable; a driving member inside the shell and having a threaded connection with the pinion sleeve; a resilient driving connection from said bored member to the driving member; and an oil seal between the collar on the pinion sleeve and the inner face of the shell to retard the passage of oil and other foreign matter into the interior of the shell.

11. An engine starter of the character described comprising: a barrel-like outer shell; a pinion; a tubular extension on the pinion projecting into one end of the shell; cooperating means on the shell and said tubular extension engageable to limit endwise motion of the tubular extension out of the shell; a member fixed to the opposite end of the shell and bored for reception of a drive shaft to which said member is securable so that the shell becomes fixed with respect to the drive shaft; and a driving connection from said member to the pinion for projecting the pinion into engagement with the flywheel of an engine to be started and for rotating the pinion after said engagement, part of said driving connection comprising an internal thread on the pinion extension and a screw shaft inside the tubular extension and threaded into said internal thread so that said part of the driving connection is encircled by the tubular pinion extension and the remainder being encircled by the shell whereby said tubular pinion extension and the shell cooperate to wholly enclose the driving connection.

12. An engine starter of the character described comprising: a barrel-like outer shell; means providing an abutment at one end of the shell; a pinion; a part extended from the pinion into said end of the shell; means on said part engageable with the abutment to limit outward movement of the pinion with respect to the shell; a member fixed to the shell and bored for reception of a drive shaft to which said member is securable whereby the shell becomes fixed with respect to the drive shaft and engagement of the means on the pinion part with the shell abutment constitutes a pinion stop; a driving member inside the shell and having a threaded connection with said pinion part; and a torsionally resilient driving connection from said bored member to the driving member inside the shell, comprising an element having cubical elasticity directly and drivingly engaged with said members and through which the driving force is transmitted.

13. An engine starter of the character described comprising: a pinion having a threaded sleeve provided with a stop shoulder; a driving member having a threaded connection with the sleeve and having a flange larger in diameter than the pinion sleeve; a member bored for reception of a drive shaft to which said member is securable; a body of material having cubical elasticity engaging said bored member and the flange on the driving member to resiliently transmit torque from the former to the latter; a cup-shaped outer shell having a hole in its bottom wall of a size to permit the pinion and its sleeves to pass therethrough but not the stop shoulder on the pinion sleeve, and having a shoulder on its side wall for engagement with the flange on the driving member; and means for attaching the open end of the shell to the bored member so that said shell receives support from the bored member, said shoulder on the side wall of the shell being so located with relation to the open end of the shell that the attachment of the shell to the bored member places the body of cubical elasticity in a state of compression.

14. In an engine starter: an externally threaded driving member having a flange and bored to receive a drive shaft; a pinion bored to receive the shaft and having an internally threaded sleeve threaded on said driving member; a stop abutment projecting radially outwardly of the sleeve; a member bored for reception of the drive shaft and to which said member is securable, said member having a surface facing that of the flange on the driving member; a ring of material having cubical elasticity, said ring engaging said surfaces and being adapted to resiliently transmit torque from the bored member to the driving member; a cup-like outer shell having a two diameter cylindrical side wall with the step therebetween providing an abrupt shoulder facing the open end of the shell, said shell encircling the driving member, pinion sleeve and said ring, and having a hole in its bottom wall of a size to permit the pinion and its sleeve to pass therethrough but insufficient to allow passage of the stop abutment so that said stop abutment is engageable with said bottom wall to define the projected position of the pinion, the large open end portion of the shell having the flange on the driving member and said elastic ring received therein with the flange engageable with said shoulder to limit movement of the flange away from the open end of the shell; and means for attaching the open end of the shell to the bored member so that said shell receives support from the bored member, and the elastic ring is subjected to pressure between the flange and said bored member to provide a resilient frictional driving connection therebetween.

15. In an engine starter: a drive shaft; a pinion movable along and with the drive shaft; a driving member movable along and with the drive shaft; a threaded connection between said members so that relative rotation between them effects endwise motion of one with respect to the other, and interference with such relative endwise motion causes said members to revolve in unison; an abutment fixed with respect to the shaft; a torsionally and endwise resilient driving connection between said abutment and the driving member including an elastically deformable body, said resilient connection becoming increasingly effective to transmit torque with reduction of the distance between the abutment and the driving member; a stop; and means connecting the stop with the abutment and supporting it in position to limit motion of the pinion member away from the abutment so that relative rotation between said members continued after endwise motion of the pinion member is arrested by the stop effects endwise motion of the driving member toward the abutment to increase the torque transmitting effectiveness of the resilient driving connection.

16. In an engine starter: a drive shaft; a pinion movable along and with the drive shaft; a driving member movable along and with the drive shaft; a threaded connection between said members so that relative rotation between them effects endwise motion of one with respect to the other, and interference with such relative endwise motion causes said members to revolve in unison; an abutment fixed with respect to the shaft; a torsionally and endwise resilient driving connection between said abutment and the driving member including an elastically deformable body, said resilient connection becoming increasingly effective to transmit torque with reduction of the distance between the abutment and the driving member; a barrel-like shell supported from the abutment and encircling the resilient driving connection and at least part of the pinion member; and a stop on said outer shell in position to limit motion of the pinion member away from the abutment so that relative rotation between said members continued after endwise motion of the pinion members is arrested by the stop, effects motion of the driving member toward the abutment to increase the torque transmitting effectiveness of the resilient driving connection.

17. In an engine starter: a drive shaft; a pinion movable along and with the drive shaft; a driving member movable along and with the drive shaft; a threaded connection between said members so that relative rotation between them effects endwise motion of one with respect to the other, and interference with such relative endwise motion causes said members to revolve in unison; an abutment fixed with respect to the shaft; a torsionally and endwise resilient driving connection between said abutment and the driving member including an elastically deformable body, said resilient connection becoming increasingly effective to transmit torque with reduction of the distance between the abutment and the driving member; a barrel-like shell supported from the abutment and encircling the resilient driving connection and at least part of the pinion member; a stop carried by said shell and in position to limit movement of the driving member away from the abutment to maintain the resilient driving connection operative; and a second stop carried by the shell and in position to limit motion of the pinion member away from the abutment so that relative rotation between said members continued after endwise motion of the pinion member is arrested by said last-named stop effects endwise motion of the driving member toward the abutment to increase the torque transmitting effectiveness of the resilient driving connection.

18. In an engine starter: a drive shaft; a pinion movable along and with the drive shaft; a driving member movable along and with the drive shaft; a threaded connection between said members so that relative rotation between them effects endwise motion of one with respect to the other, and interference with such relative endwise motion causes said members to revolve in unison; an abutment fixed with respect to the shaft; a torsionally and endwise resilient driving connection between said abutment and the driving member including an elastically deformable body, said resilient connection becoming increasingly effective to transmit torque with reduction of the distance between the abutment and the driving member; a two-diameter cylindrical housing member having its large diameter end supported from the abutment, the stop between the two diameters of the housing member providing a stop engageable by a portion of the driving member to limit movement of the driving member away from the abutment; and means on the small diameter end portion of the housing member engageable with part of the pinion member to limit movement of the pinion member away from the abutment.

OSCAR F. GOTTLIEB.
IRA MILTON JONES.
ERICH EUGENE KOHLS.